(12) United States Patent
Ohdoi et al.

(10) Patent No.: US 9,290,086 B2
(45) Date of Patent: Mar. 22, 2016

(54) SUNROOF APPARATUS (71) Applicant: WEBASTO SE, Stockdorf (DE)

(72) Inventors: Kozo Ohdoi, Higashi-Hiroshima (JP); Akihiro Shinkawa, Higashi-Hiroshima (JP)

(73) Assignee: WEBASTO SE, Stockdorf (DE)

( * ) Notice: Subject to any disclaimer, the term of this patent is extended or adjusted under 35 U.S.C. 154(b) by 0 days.

(21) Appl. No.: 14/390,608

(22) PCT Filed: Apr. 8, 2013

(86) PCT No.: PCT/EP2013/057320
§ 371 (c)(1),
(2) Date: Oct. 3, 2014

(87) PCT Pub. No.: WO2013/153036
PCT Pub. Date: Oct. 17, 2013

(65) Prior Publication Data
US 2015/0091334 A1    Apr. 2, 2015

(30) Foreign Application Priority Data

Apr. 10, 2012 (JP) ................................. 2012-089509

(51) Int. Cl.
*B60J 7/053*  (2006.01)
*B60J 7/057*  (2006.01)
*B60J 7/05*   (2006.01)

(52) U.S. Cl.
CPC ........................................ *B60J 7/05* (2013.01)

(58) Field of Classification Search
CPC ............ B60J 7/05; B60J 7/0435; B60J 7/047; B60J 7/053; B60J 7/057; B60J 7/0573

USPC ................ 296/221, 222, 216.02–216.05, 223
See application file for complete search history.

(56) References Cited

U.S. PATENT DOCUMENTS

| 4,752,099 A | * | 6/1988 | Roos et al. ..................... 296/223 |
| 5,718,472 A | * | 2/1998 | Otake et al. ................... 296/221 |
| 6,913,311 B2 | * | 7/2005 | Weiss et al. ................... 296/213 |
| 8,500,193 B2 | | 8/2013 | Faerber et al. |
| 2012/0068501 A1 | | 3/2012 | Faerber et al. |

FOREIGN PATENT DOCUMENTS

| JP | 2000-085364 A | 3/2000 |
| JP | 2006-027493 A | 2/2006 |
| WO | 2010/099768 A1 | 9/2010 |

OTHER PUBLICATIONS

International Search Report dated Jun. 18, 2013, issued in International Application PCT/EP2013/057320.

* cited by examiner

*Primary Examiner* — Dennis H Pedder
(74) *Attorney, Agent, or Firm* — Fitch, Even, Tabin & Flannery LLP (57) ABSTRACT

In an opening/closing mechanism of a sunroof apparatus, an engaged portion engaged with a cam groove smoothly slides on upper and lower cam surfaces of a cam groove, and stiffness to support a roof panel is increased at low costs. The engaged portion includes a first sliding portion having a convex curve facing upward and sliding on the upper cam surface of the cam groove, and a second sliding portion coupled to the first sliding portion at a front or a rear of a vehicle, having a convex curve facing downward, and sliding on the lower cam surface of the cam groove.

5 Claims, 11 Drawing Sheets

SUNROOF APPARATUS

CROSS REFERENCE TO RELATED APPLICATIONS

This application is a U.S. national phase application of International Application No. PCT/EP2013/057320, filed Apr. 8, 2013, which claims benefit of the priority date of Japanese Application 2012-089509 filed Apr. 10, 2012, which are hereby incorporated herein by reference in their entirety.

TECHNICAL FIELD

The present invention relates to sunroof apparatuses including a roof panel provided in an opening formed in a fixed roof of a vehicle, and an opening/closing mechanism which opens and closes the opening by at least obliquely moving the roof panel relative to the opening in an vertical direction.

BACKGROUND

Conventionally, this type of sunroof apparatus has been well known (see, for example, Patent Document 1). The above-described opening/closing mechanism of the sunroof apparatus usually includes a support member fixed to the roof panel, a guide rail fixed to the fixed roof, and extending in a longitudinal direction of the vehicle, a movable member movable along the guide rail in the longitudinal direction of the vehicle, a cam groove provided in one of the support member or the movable member, and including an upper cam surface and a lower cam surface facing each other in the vertical direction and extending in the longitudinal direction of the vehicle, and a pin provided in the other one of the support member or the movable member to project in a vehicle width direction, being engaged with the cam groove, and relatively sliding on the upper and lower cam surfaces of the cam groove by movement of the movable member. Relative slide movement of the pin on the upper and lower cam surfaces of the cam groove obliquely moves the roof panel. In the Patent Document 1, a resin collar (roller) is interposed between the pin and the cam groove.

CITATION LIST

Patent Document

PATENT DOCUMENT 1: Japanese Patent Publication No. 2000-85364

SUMMARY OF THE INVENTION

Technical Problem

The support member and the movable member are required to be stiff to some extent to support the relatively heavy roof panel on the guide rail (eventually the fixed roof). Thus, the support member, the movable member, and the pin are generally made of metal. On the other hand, the metal pin does not smoothly slide on the upper and lower metal cam surfaces of the cam groove, and abnormal noise may occur. Therefore, the resin collar (roller) is interposed between the pin and the cam groove as shown in Patent Document 1.

However, the sun roof of Patent Document 1 requires, in addition to the pin, the collar (roller) as an engaged portion engaged with the cam groove, thereby increasing the number of the members and the costs. Since the collar is provided around the pin, the thickness of the collar is difficult to increase. That is, the width of the cam groove (i.e., the distance between the upper and lower cam surfaces) is usually difficult to increase under the height constraint of the ceiling of the vehicle cabin, and the thickness and the outer diameter of the collar are limited. Thus, a resin collar has lower stiffness to support the roof panel, and is likely to be damaged when an excessive load is applied to the collar. In addition, since the outer diameter cannot be increased, the contact between the collar and the upper and lower cam surfaces is close to point contact. As a result, an excessive load is likely to be applied to the collar, thereby further damaging the collar.

The present invention is made in view of the problem. It is an objective of the present invention to smoothly slide an engaged portion, which is engaged with a cam groove, on upper and lower cam surfaces of the cam groove, while increasing the stiffness to support a roof panel at low costs.

Solution to the Problem

In order to achieve the objective, the present invention targets a sunroof apparatus including a roof panel provided in an opening formed in a fixed roof of a vehicle; and an opening/closing mechanism opening and closing the opening by at least obliquely moving the roof panel relative to the opening in an vertical direction. The opening/closing mechanism includes a support member fixed to the roof panel, a guide rail fixed to the fixed roof, and extending in a longitudinal direction of the vehicle, a movable member movable along the guide rail in the longitudinal direction of the vehicle, a cam groove provided in one of the support member or the movable member, and including an upper cam surface and a lower cam surface facing each other in the vertical direction and extending in the longitudinal direction of the vehicle, and an engaged portion provided in the other one of the support member or the movable member to project in a vehicle width direction, being engaged with the cam groove, and relatively sliding on the upper and lower cam surfaces of the cam groove by movement of the movable member. Relative slide movement of the engaged portion on the upper and lower cam surfaces of the cam groove obliquely moves the roof panel relative to the opening in the vertical direction. The engaged portion includes a first sliding portion having a convex curve facing upward, and sliding on the upper cam surface of the cam groove, and a second sliding portion coupled to the first sliding portion at a front or a rear of the vehicle, having a convex curve facing downward, and sliding on the lower cam surface of the cam groove.

This configuration does not require any collar (roller) around a pin, if the engaged portion is the pin. When the engaged portion is made of metal, the stiffness to support the roof panel can be increased at low costs. The engaged portion supports the one of the materials along a length to some extent in the longitudinal direction of the vehicle. This also increases the stiffness to support the roof panel. Furthermore, even when the width of the cam groove (i.e., the distance between the upper and lower cam surfaces) is small, the curvature radiuses of the first and second sliding portions can be both increased. Then, an excessive load is less likely to be applied between the first sliding portion and the upper cam surface, and between the second sliding portion and the lower cam surface. As a result, even when the engaged portion is made of metal without any collar (roller), the engaged portion (the first and second sliding portions) tends to smoothly slide on the upper and lower cam surfaces. Since an excessive load is less likely to be applied between the first sliding portion and the upper cam surface, and between the second sliding portion and the lower cam surface, the upper and lower cam surfaces can be made of resin, thereby providing smoother slide.

In the sunroof apparatus, the engaged portion is preferably made of a metal member, and bended in a substantial S shape when viewed from the vehicle width direction.

With this configuration, the engaged portion is easily provided in the other material at low cost, and the stiffness to support the roof panel reliably increases.

Where the engaged portion is made of a metal material, the member provided with the cam groove is preferably formed by integrally molding a resin member and the metal member, and the upper and lower cam surfaces of the cam groove are preferably made of the resin member.

This configuration allows the engaged portion to slide on the upper and lower cam surfaces more smoothly, while maintaining the stiffness to support the roof panel.

Advantages of the Invention

As described above, in the sunroof apparatus according to the present invention, the engaged portion engaged with the cam groove includes the first sliding portion having the convex curve facing upward, and sliding on the upper cam surface of the cam groove, and the second sliding portion coupled to the first sliding portion at the front or the rear of the vehicle, having the convex curve facing downward, and sliding on the lower cam surface of the cam groove. As a result, the engaged portion smoothly slides on the upper and lower cam surfaces of the cam groove, while increasing the stiffness to support the roof panel at low costs.

DETAILED DESCRIPTION

An embodiment of the present invention will be described hereinafter with reference to the drawings.

Figure 1:
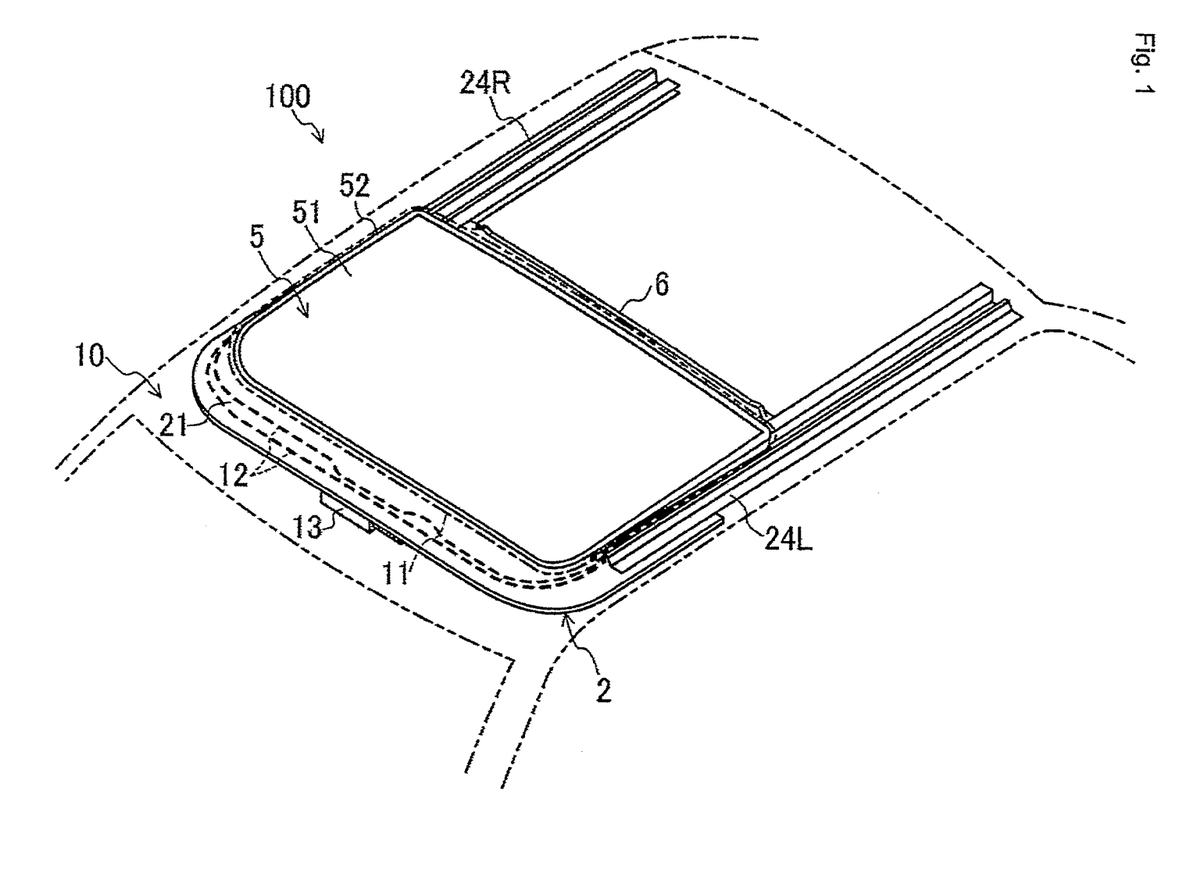
FIG. 1 is a perspective view of a sunroof apparatus according to an embodiment of the present invention when a movable panel is at a fully closed position.
Figure 2:
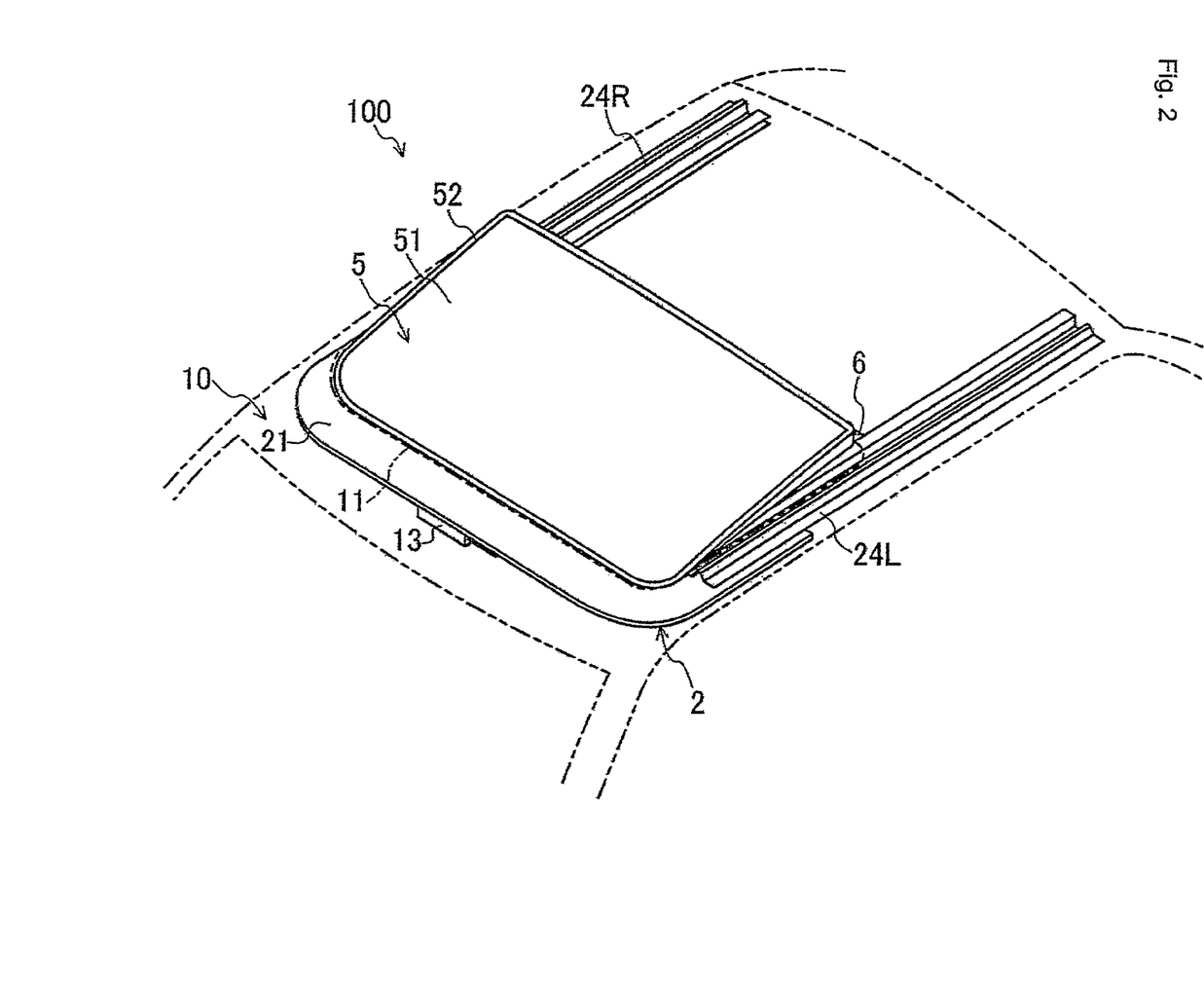
FIG. 2 is a view corresponding to FIG. 1 and illustrating the sunroof apparatus when the movable panel is at a tilt position.
Figure 3:
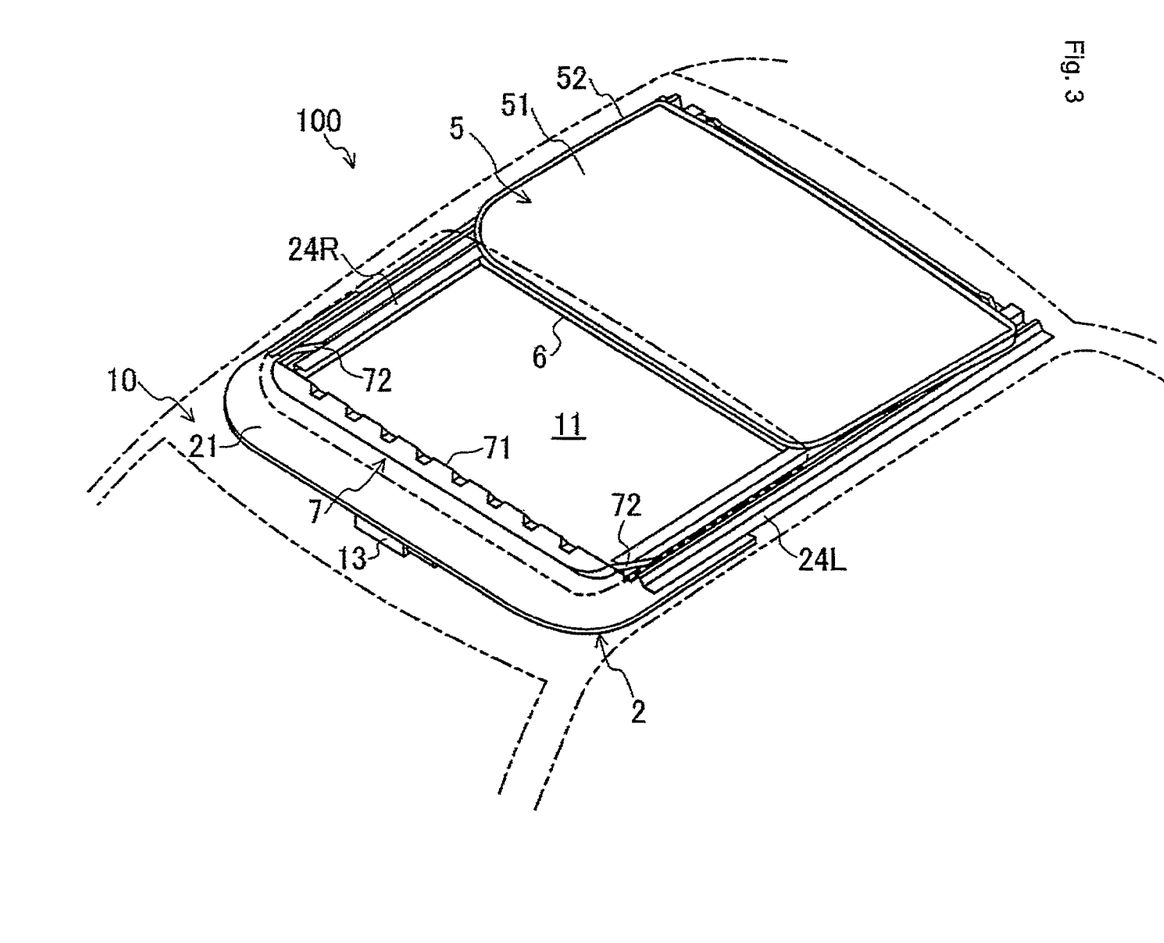
FIG. 3 is a view corresponding to FIG. 1 and illustrating the sunroof apparatus when the movable panel is at a fully open position.

FIGS. 1-3 illustrate a sunroof apparatus 100 according to the embodiment of the present invention. This sunroof apparatus 100 is provided in an opening 11 formed in a fixed roof 10 of a vehicle. Hereinafter, the front, rear, right, and left of the vehicle are simply referred to as front, rear, right, and left.

The sunroof apparatus 100 includes a frame 2 located along the edge of the opening 11 and fixed to the fixed roof 10, a movable panel 5 obliquely movable in the vertical direction and movable in the longitudinal direction relative to the frame 2 (i.e., the opening 11) (i.e., to open and close the opening 11), a shade 6 provided below the movable panel 5, a deflector 7 (shown in FIG. 3 only) provided at the front end of the frame 2, and opening/closing mechanisms (see FIG. 4) provided at the both sides of the opening 11 in the vehicle width direction, and opening/closing the movable panel 5 to uncover and cover the opening 11. In this embodiment, the movable panel 5 denotes the roof panel provided in the opening 11.

The movable panel 5 is driven by a drive motor 13 through right and left opening/closing mechanisms 8 to switch among three positions of a fully closed position shown in FIG. 1, a tilt position shown in FIG. 2, and an open position (a fully open position in FIG. 3).

At the fully closed position, the periphery of the movable panel 5 is in close contact with the edge of the opening 11 to fully close the opening 11.

At the tilt position, the movable panel 5 obliquely moves from the fully closed position to tilt upward gradually toward the rear (i.e., the rear end of the movable panel 5 becomes higher than the front end) relative to the opening 11. Then, the rear end of the movable panel 5 raised higher than the rear edge of the opening 11. As a result, a clearance is formed between the rear end of the movable panel 5 and the rear edge of the opening 11, and then the rear of the opening 11 is slightly open, thereby ventilating the cabin of the vehicle.

At the open position, the movable panel 5 obliquely moves from the fully closed position to tilt downward gradually toward rear relative to the opening 11. Then, the rear end of the movable panel 5 sinks as compared to the fully closed position. In this state, the movable panel 5 slides below the fixed roof 10, which is located at the rear of the movable panel 5 when at the fully closed position. At this time, the front of the opening 11 is open. When the movable panel 5 is at the fully open position, at which the movable panel 5 opens the opening 11 most, the movable panel 5 largely overlaps the fixed roof 10, which is located at the rear of the movable panel 5 when at the fully closed position. Then, substantially the entire opening 11 is open.

The frame 2 includes a front frame 21 extending substantially in the vehicle width direction, and a right guide rail 24R and a left guide rail 24L extending in the longitudinal direction. The drive motor 13 for driving a push-pull cable 12 (shown in FIG. 1 only) is attached to the front frame 21. The right guide rail 24R and the left guide rail 24L have symmetrical structures. The push-pull cable 12 is embedded in the front frame 21, the right guide rail 24R, and the left guide rail 24L. The right and left guide rails 24R and 24L are part of the right and left opening/closing mechanisms 8, respectively. When the right and left are not distinguished, the right and left guide rails 24R and 24L will be also simply referred to as the guide rails 24.

The movable panel 5 includes a glass panel 51 in a substantially rectangular shape when viewed from above, and a weather strip 52 provided at the periphery of the glass panel 51.

The shade 6 is a board having substantially the same size as the movable panel 5. The both of the right and left edges of the shade 6 are guided by the right guide rail 24R and the left guide rail 24L.

As shown in FIG. 3, the deflector 7 includes a body portion 71 extending in the vehicle width direction, and coupling portions 72 extending rearward from the both ends of the body portion 71 in the vehicle width direction. The body portion 71 extends in the vehicle width direction from the left guide rail 24L to the right guide rail 24R. That is, the length of the body portion 71 in the vehicle width direction is approximately equal to the length of the front frame 21 in the vehicle width direction. The rear ends of the coupling portions 72 are rotatably coupled to the front ends of the guide rails 24. The coupling portions 72 are biased so that the body portion 71 raised higher than the front frame 21. On the other hand, the front frame 21 has a recessed groove (not shown) for accommodating the body portion 71 when the coupling portion 72 is pushed down. Thus, when the movable panel 5 is at the fully closed position or the tilt position, the deflector 7 is pushed down by the front of the movable panel 5, and is accommodated in the recessed groove (not shown) formed in the front frame 21. At this time, as shown in FIGS. 1 and 2, since the deflector 7 is hidden between the movable panel 5 and the front frame 21, the deflector 7 is not exposed to the outside. On the other hand, when the movable panel 5 is at the open position, as shown in FIG. 3, the deflector 7 is exposed to the outside and raised higher than the front frame 21.

Figure 4:
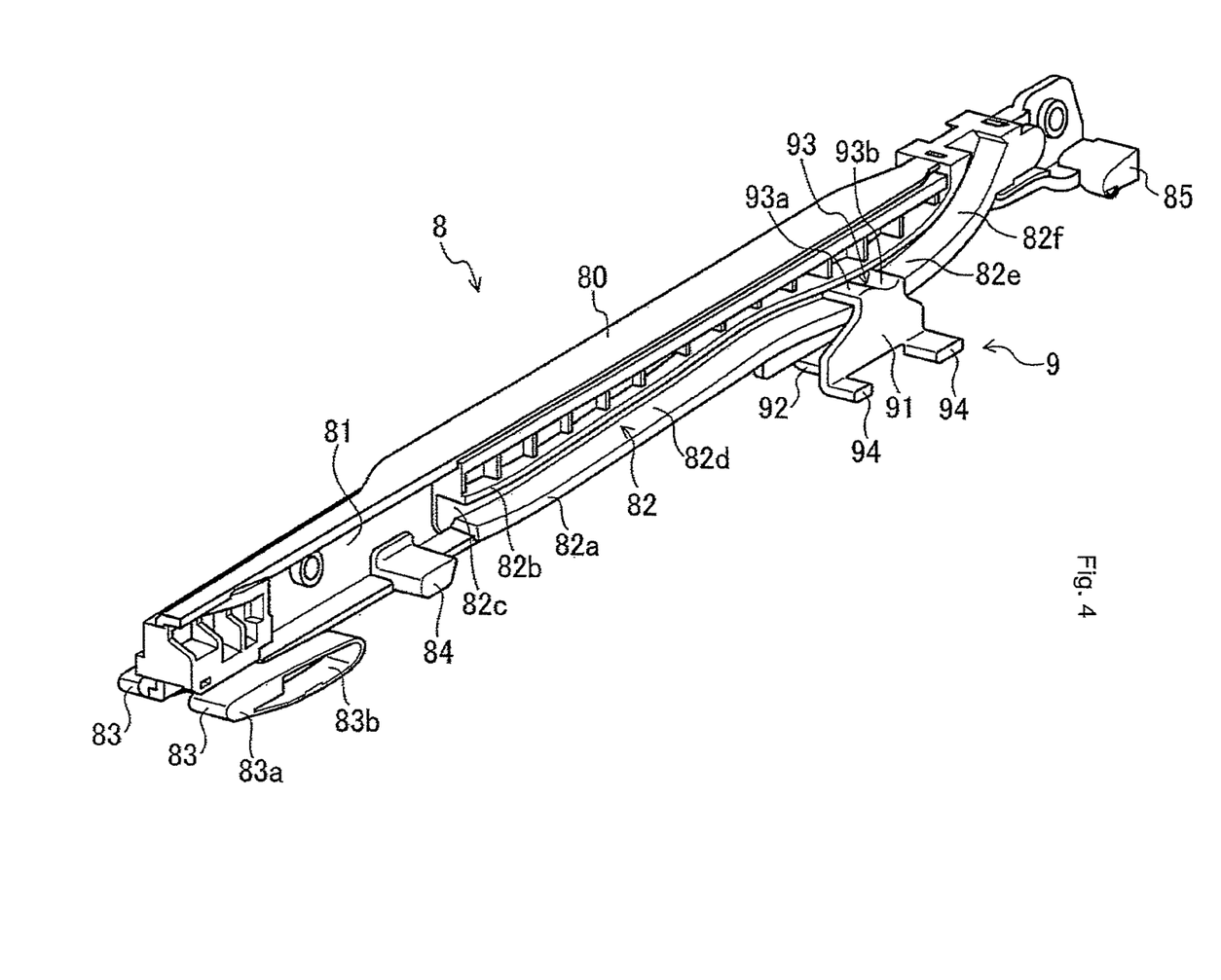
FIG. 4 is a perspective view of a left opening/closing mechanism, in which a left guide rail is not shown.
Figure 5:
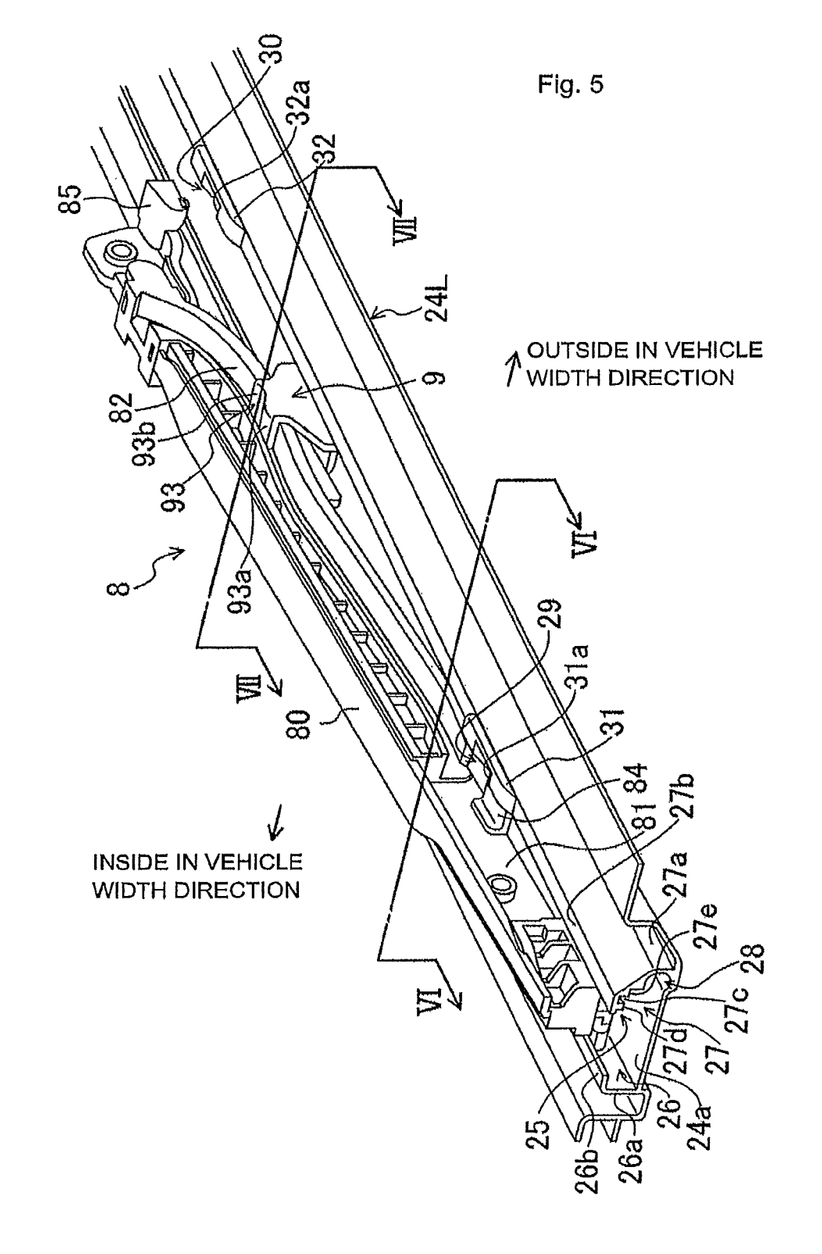
FIG. 5 is a perspective view of a left opening/closing mechanism, in which a support member and a slider are supported by a left guide rail.

FIG. 4 is a perspective view of the left opening/closing mechanism 8, in which the left guide rail 24L is not shown. FIG. 5 is a perspective view of the left opening/closing mechanism 8, in which a support member 80 and a slider 9, which will be described later, are supported by the left guide rail 24L.

Each of the right and left opening/closing mechanisms 8 includes the support member 80 fixed to each end of the movable panel 5 in the vehicle width direction, and the right guide rail 24R or the left guide rail 24L fixed to the fixed roof 10 and extending in the longitudinal direction. Each opening/closing mechanism 8 also includes the slider 9 (corresponding to the movable member) movable along the corresponding one of the guide rails 24 in the longitudinal direction, moving the support member 80 in the longitudinal direction, and obliquely moving the support member 80 in the vertical direction. The support member 80 and the slider 9 are movably supported by the guide rail 24 in the longitudinal direction. The support member 80 and the slider 9 support the movable panel 5 relative to the guide rail 24 (i.e., the front of the movable panel 5 is supported by the support member 80, and rear is supported by the support member 80 and the slider 9). The configurations of the support member 80 and the slider 9 will be described later in detail.

Since the right and left opening/closing mechanisms 8 have symmetrical structures, the configuration of the left opening/closing mechanism 8 will be described hereinafter.

First, the detailed configuration of the guide rail 24 (herein the left guide rail 24L) will be described. As shown in FIG. 5, the left guide rail 24L includes a passage 25 through which the support member 80 moves in the longitudinal direction, first and second guide grooves 26 and 27 located at both sides of the passage 25, and a cable guide groove 28 in which the push-pull cable 12 (shown in FIG. 1 only) is to be embedded. The first guide groove 26 is located at the inner side of the passage 25 in the vehicle width direction, whereas the second guide groove 27 is located at the outer side of the passage 25 in the vehicle width direction. The first guide groove 26 is open to the outside in the vehicle width direction. On the other hand, the second guide groove 27 is open to the inside in the vehicle width direction. That is, the first guide groove 26 and the second guide groove 27 face each other with the passage 25 interposed therebetween. The cable guide groove 28 is located outside the second guide groove 27 in the vehicle width direction, and communicates with the second guide groove 27.

More specifically, the left guide rail 24L includes: a lower wall 24a extending substantially horizontally in the longitudinal direction; a first vertical wall 26a projecting upward from the inner side of the lower wall 24a in the vehicle width direction; a first upper wall 26b extending substantially horizontally outward from the upper end of the first vertical wall 26a in the vehicle width direction; a second vertical wall 27a projecting upward from the outer side of the lower wall 24a in the vehicle width direction; and a second upper wall 27b extending substantially horizontally inward from the upper end of the second vertical wall 27a in the vehicle width direction. The second vertical wall 27a projects upward from the lower wall 24a, and then tilts toward the passage 25. Similar to the lower wall 24a, the first vertical wall 26a, the first upper wall 26b, the second vertical wall 27a, and the second upper wall 27b extend in the longitudinal direction.

The first guide groove 26 is formed of the lower wall 24a, the first vertical wall 26a, and the first upper wall 26b. The upper surface of the lower wall 24a and the lower surface of the first upper wall 26b serve as guide surfaces.

The second guide groove 27 is formed of the lower wall 24a, the second vertical wall 27a, and the second upper wall 27b. A recessed groove 27c, which extends in the longitudinal direction approximately in the middle of the vehicle width direction, is formed in the lower surface of the second upper wall 27b. The lower surface of the second upper wall 27b is divided by the recessed groove 27c into a first guide surface 27d close to the passage 25 and a second guide surface 27e apart from the passage 25. The distance between the first guide surface 27d and the lower wall 24a is slightly larger than the distance between the second guide surface 27e and the lower wall 24a.

A portion of the lower wall 24a near a portion thereof coupled to the second vertical wall 27a is recessed downward. This recessed portion of the lower wall 24a, and the second vertical wall 27a form the cable guide groove 28.

Figure 6:
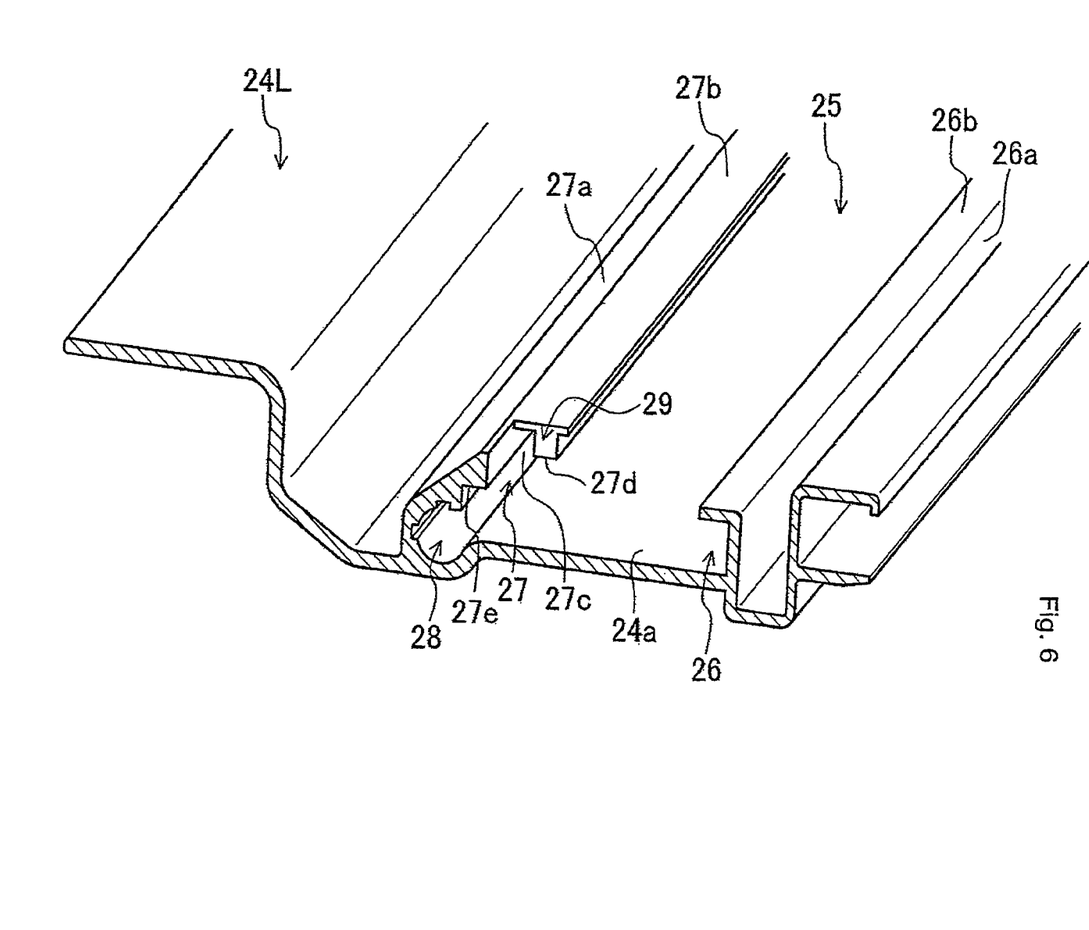
FIG. 6 is a cross-sectional perspective view of the guide rail taken along the line VI-VI of FIG. 5.

The second upper wall 27b has first and second cutout portions 29 and 30. FIG. 6 is a cross-sectional perspective view of the guide rail 24 taken along the line VI-VI of FIG. 5. A first guide groove 31a is not shown, which will be described later. The first cutout portion 29 is located forward of the second cutout portion 30. The first cutout portion 29 is formed by cutting out the edge of the second upper wall 27b at the passage 25 into an approximately rectangular shape in the width direction of the second upper wall 27b. More specifically, the first cutout portion 29 reaches the recessed groove 27c in the width direction. Thus, the first guide surface 27d is divided by the first cutout portion 29 into a front portion and a rear portion. Similar to the first cutout portion 29, the second cutout portion 30 is formed by cutting out the edge of the second upper wall 27b at the passage 25 into a shape reaching the groove 27c in the width direction. The first guide surface 27d is also divided by the second cutout portion 30 into a front portion and a rear portion. On the other hand, the second guide surface 27e is not divided by the first and second cutout portions 29 and 30 in the longitudinal direction, i.e., is continuous from the front to the rear.

The first cutout portion 29 includes a first guide member 31. The first guide member 31 has the first guide groove 31a which is open to the passage 25 and extends substantially in the vertical direction. The lower end of the first guide groove 31a has an opening in the second guide groove 27. This opening is formed by cutting out the edge of the second upper wall 27b at the passage 25 in the width of the second upper wall 27b. The opening reaches the recessed groove 27c in the width direction. On the other hand, the second cutout portion 30 includes a second guide member 32. The second guide member 32 has a second guide groove 32a which is open to the passage 25 and extending substantially in the vertical direction. The lower end of the second guide groove 32a has an opening in the second guide groove 27. This opening is also formed by cutting out the edge of the second upper wall 27b at the passage 25 in the width of the second upper wall 27b, and reaches the recessed groove 27c.

Figure 7:
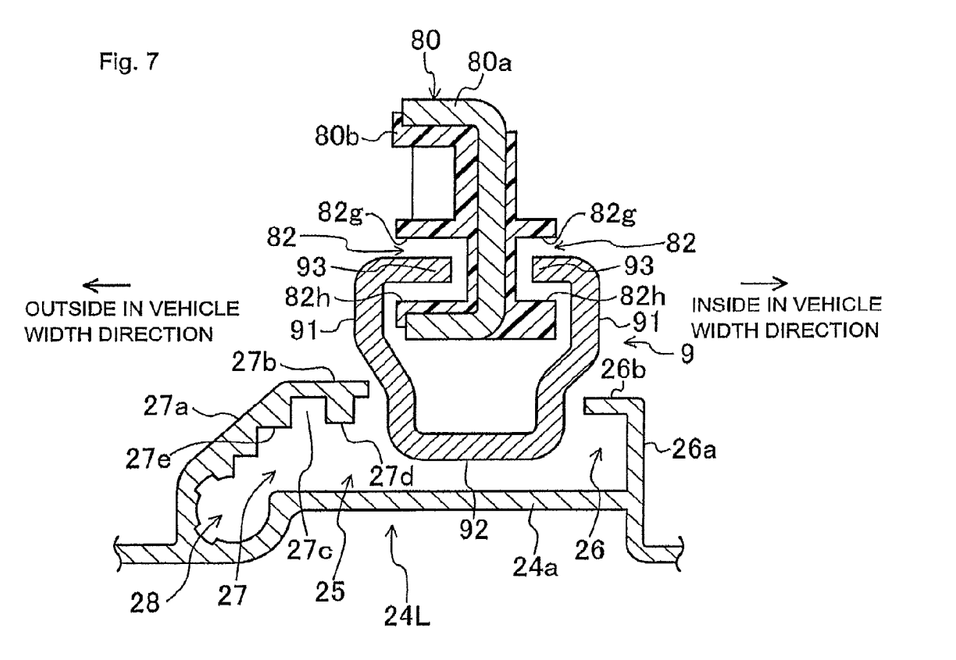
FIG. 7 is a cross-sectional view taken along the line VII-VII of FIG. 5.

FIG. 7 is a cross-sectional view taken along the line VII-VII of FIG. 5. As shown in FIGS. 4, 5, and 7, the support member 80 includes a body portion 81 extending substantially in the longitudinal direction at a standing position so that the thickness direction of the body portion 81 coincides with the vehicle width direction, and cam grooves 82 which are open in both side surfaces of the body portion 81. The body portion 81 is fixed to the movable panel 5 at the front and rear ends with brackets (not shown) interposed therebetween. Each cam groove 82 includes upper and lower cam surfaces 82g and 82h facing each other in the vertical direction and extending in the longitudinal direction. The width of the cam groove 82 (i.e., the distance between the upper and lower cam surfaces 82g and 82h) is substantially uniform in the longitudinal direction.

As shown in FIG. 7, the support member 80 is formed by integrally molding a metal plate 80a (metal member) and a resin member 80b. Specifically, the support member 80 is formed by insert molding of the metal plate 80a into part of the resin member 80b. The metal plate 80a extends in the vertical direction, in the middle of the support member 80 in the vehicle width direction, and bends outward (to the left in FIG. 7) at the both upper and lower ends in the vehicle width direction. The upper and lower cam surfaces 82g and 82h of the cam grooves 82 are part of the resin member 80b.

Each cam groove 82 (i.e., the upper and lower cam surfaces 82g and 82h) extends substantially in the longitudinal direction along a predetermined curve when viewed from the vehicle width direction. Specifically, when viewed from the vehicle width direction, the outer side surface of the body portion 81 in the vehicle width direction is provided with a lower wall 82a extending along the predetermined curve, and an upper wall 82b located above the lower wall 82a and extending substantially in parallel with the lower wall 82a. The lower wall 82a, the upper wall 82b, and a side wall 82c, which connects the lower wall 82a to the upper wall 82b, form the cam groove 82 on the outer side surface in the vehicle width direction. The lower surface of the upper wall 82b is the upper cam surface 82g, the upper surface of the lower wall 82a is the lower cam surface 82h, and the side wall 82c is the bottom of the cam groove 82. The upper portion of the lower wall 82a, the outer portions of the upper wall 82b and the side wall 82c in the vehicle width direction are part of the resin member 80b. Similar to the outer side surface in the vehicle width direction, the inner side (the right side in FIG. 7) surface of the body portion 81 in the vehicle width direction is also provided with a lower wall 82a and an upper wall 82b. The lower wall 82a, the upper wall 82b, and a side wall 82c, which connects the lower wall 82a to the upper wall 82b, form the cam groove 82 on the inner side surface in the vehicle width direction. (This side wall 82c is the same as the side wall 82c forming the cam groove 82 on the outer side surface in the vehicle width direction.) The lower wall 82a and the upper wall 82b of the inner side surface in the vehicle width direction, and the outer portion of the side wall 82c in the vehicle width direction are part of the resin member 80b. That is, the lower walls 82a and the upper walls 82b of the both side surfaces of the body portion 81 in the vehicle width direction are part of the resin member 80b. Note that the lower portion of the lower wall 82a of the outer side surface in the vehicle width direction is part of the metal plate 80a. The center of the side wall 82c in the vehicle width direction is part of the metal plate 80a. The both sides (at the side of the cam groove 82) of the side wall 82c in the vehicle width direction are part of the resin member 80b. At the side wall 82c, the resin member 80b may not be provided and the metal plate 80a may be exposed to the cam groove 82.

The cam groove 82 is engaged with an engaged portion 93 of the slider 9, which will be described later in detail. The cam groove 82 has a tilt region 82d in which the engaged portion 93 is located when the movable panel 5 is at the tilt position, a fully closed region 82e in which the engaged portion 93 is located when the movable panel 5 is at the fully closed position, and a descending region 82f in which the engaged portion 93 is located when the movable panel 5 is at a descending position. The tilt region 82d, the fully closed region 82e, and the descending region 82f are sequentially arranged from the front in this order. The shape of the cam groove 82 (i.e., the upper and lower cam surfaces 82g and 82h) varies at the tilt region 82d, the fully closed region 82e, and the descending region 82f. The cam groove 82 curves in a convex shape at the interface between the tilt region 82d and the fully closed region 82e, and in a concave shape at the interface between the fully closed region 82e and the descending region 82f.

Two right and left shoes 83 are provided at the front end of the body portion 81. Each shoe 83 includes a tip portion 83a joined to the body portion 81, and a belt-like portion 83b extending rearward from the lower end of the tip portion and then folded back to be coupled to the rear end of the tip portion. Each shoe 83 has a ring shape as a whole. The shoes 83 are made of resin, and the ring shape can be elastically deformed. The two shoes 83 are engaged with the first and second guide grooves 26 and 27 of the guide rail 24. Specifically, one of the shoes 83 located at the inner side of the body portion 81 in the vehicle width direction is engaged with the first guide groove 26, and the other shoe 83 located at the outer side of the body portion 81 is engaged with the second guide groove 27.

A front pin 84 projecting outward in the vehicle width direction from the body portion 81 is provided on a relatively front portion of the body portion 81 and at the rear of the shoes 83. A rear pin 85 projecting outward in the vehicle width direction from the body portion 81 is provided at the rear end of the body portion 81. The front and rear pins 84 and 85 are engaged with the second guide groove 27.

Right and left sliding portions (not shown) of the slider 9, which will be described later, are engaged with the second and first guide grooves 27 and 26 of the guide rail 24 so that the slider 9 is movable in the longitudinal direction along the first and second guide grooves 26 and 27. The push-pull cables 12 (shown in FIG. 1 only) is coupled to the slider 9, and drives the slider 9 along the guide rail 24 in the longitudinal direction. The slider 9 (specifically, engaged portions 93, which will be described later) is also engaged with the cam groove 82 of the support member 80. Specifically, the slider 9 includes a pair of facing right and left vertical walls 91, a joint wall 92 joining the lower ends of the vertical walls 91 together, and the engaged portions 93 located at the upper ends of the vertical walls 91 and projecting toward the respective facing vertical walls 91 in the vehicle width direction.

The slider 9 also includes projecting strips 94 (only the projecting strip 94 of the left vertical wall 91 is visible in FIG. 4) located at the rear and front ends of each vertical wall 91 and projecting in the opposite direction to the respective facing vertical walls 91, and right and left sliding portions (not shown) provided on the projecting strips 94. The slider 9 is formed by insert molding of a steel metal plate (i.e., a metal member) into part of the resin member. (In FIG. 7, the part of the resin member (i.e., the sliding portion) is not shown.) Each vertical wall 91, the joint wall 92, the engaged portion 93, and the projecting strips 94 are curved metal plates. That is, the engaged portion 93 is a metal plate and is integrally formed with the slider 9. The sliding portion is a resin member. The right and left sliding portions are respectively engaged with the second and first guide grooves 27 and 26 of the guide rail 24. The outer sliding portion in the vehicle width direction is integrally formed with the push-pull cable 12. The push-pull cable 12 is engaged with the cable guide groove 28 of the guide rail 24.

The engaged portion 93 is engaged with the cam groove 82 of the support member 80, and relatively slides on the upper and lower cam surfaces 82*g* and 82*h* of the cam groove 82 by the movement of the slider 9 in the longitudinal direction. This relative slide movement of the engaged portion 93 on the upper and lower cam surfaces 82*g* and 82*h* of the cam groove 82 obliquely moves the support member 80 (i.e., the movable panel 5) such that the rear end becomes higher or lower than the front end, and moves in the longitudinal direction to open and close the opening 11.

The engaged portions 93 extend from the upper ends of the vertical walls 91 of the slider 9 toward the cam grooves 82 at the both of right and left side surfaces of the support member 80 in the vehicle width direction, and inserted into the cam grooves 82. Each engaged portion 93 includes a first sliding portion 93*a* having a convex curve (a circular arc in this embodiment) facing upward, and sliding on the upper cam surface 82*g* of the cam groove 82. The engaged portion 93 also includes a second sliding portion 93*b* coupled to the first sliding portion 93*a* at the rear (or may be at the front), having a convex curve (a circular arc in this embodiment) facing downward, and sliding on the lower cam surface 82*h* of the cam groove 82. In this embodiment, each engaged portion 93 bends in an S-shape when viewed from the vehicle width direction (see particularly FIGS. 8-11).

Then, operation of the movable panel 5 by the opening/closing mechanism 8 having the above-described configuration will be described. In the following description, operation of the movable panel 5 will be described with reference to the engagement relationship between the second guide groove 27 and each shoe 83, the front pin 84, and the rear pin 85. Irrespective of the position of the movable panel 5, the inner shoe 83 in the vehicle width direction is always engaged with the first guide groove 26.

Figure 8:
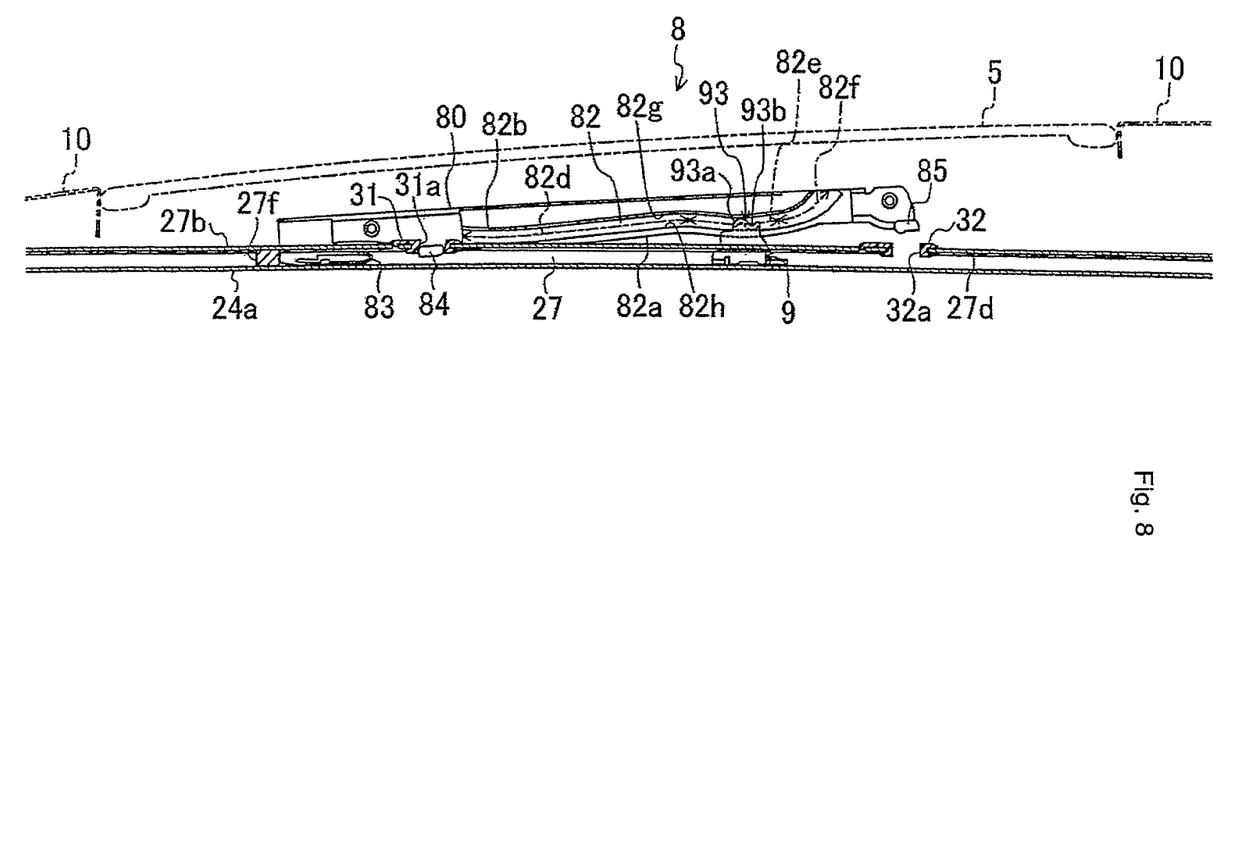
FIG. 8 is a vertical cross-sectional view of an opening/closing mechanism in a second guide groove when a movable panel is at a fully closed position.
Figure 9:
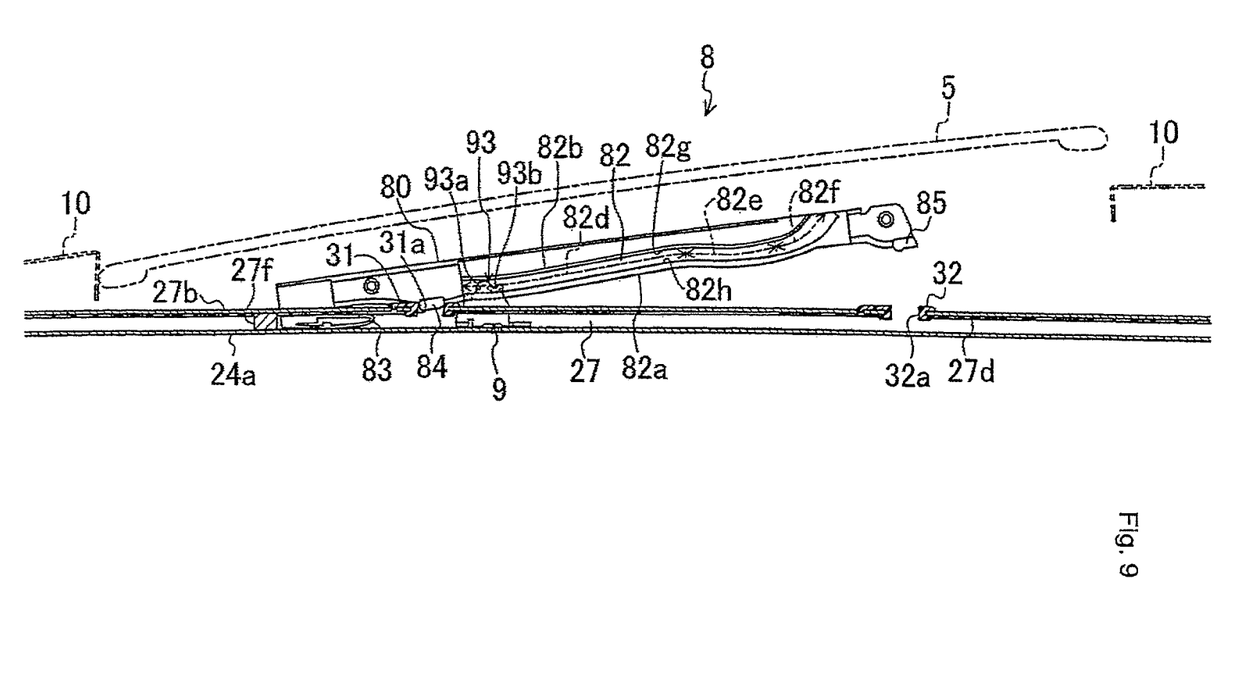
FIG. 9 is a view corresponding to FIG. 8 and illustrating the opening/closing mechanism when the movable panel is at a tilt position.
Figure 10:
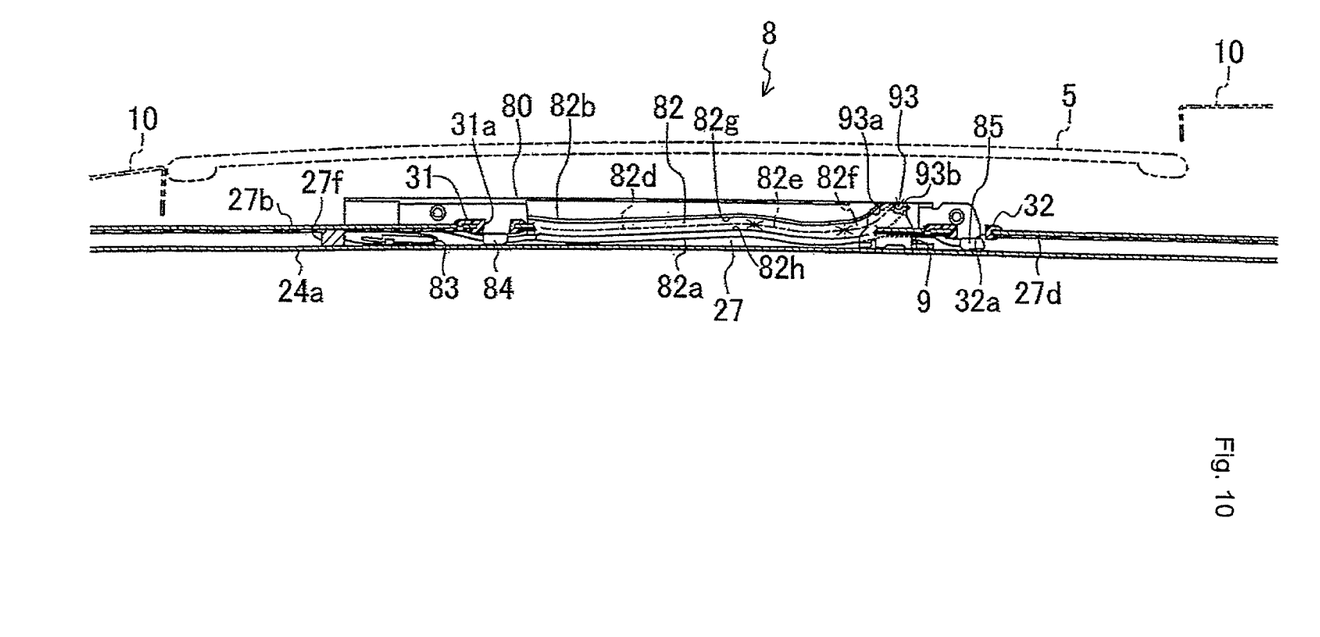
FIG. 10 is a view corresponding to FIG. 8 and illustrating the opening/closing mechanism when the movable panel is at a descending position.
Figure 11:
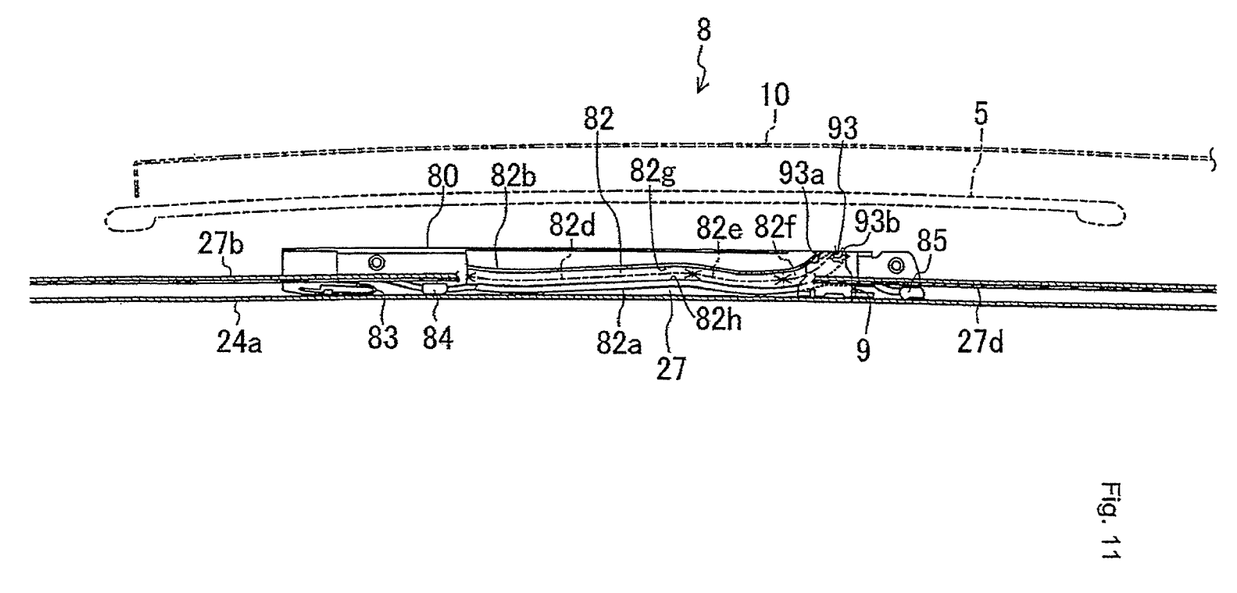
FIG. 11 is a view corresponding to FIG. 8 and illustrating the opening/closing mechanism when the movable panel is at a fully open position.

FIG. 8 is a vertical cross-sectional view of the opening/closing mechanism 8 in the second guide groove 27 when the movable panel 5 is at the fully closed position. FIG. 9 is a vertical cross-sectional view of the opening/closing mechanism 8 in the second guide groove 27 when the movable panel 5 is at the tilt position. FIG. 10 is a vertical cross-sectional view of the opening/closing mechanism 8 in the second guide groove 27 when the movable panel 5 is at the descending position. FIG. 11 is a vertical cross-sectional view of the opening/closing mechanism 8 in the second guide groove 27 when the movable panel 5 is at the fully open position.

As shown in FIG. 8, at the fully closed position, each engaged portion 93 of the slider 9 is located in the fully closed region 82*e* of the cam grooves 82. At this time, the shoes 83 (only one of which is shown in FIGS. 8-10) are in contact with a stopper 27*f* provided in the second guide groove 27, thereby preventing the support member 80 from further moving forward. The locations of the front and rear pins 84 and 85 in the longitudinal direction respectively coincide with the locations of the first and second guide members 31 and 32 in the longitudinal direction. The front pin 84 enters the first guide groove 31*a* of the first guide member 31. This also prevents the support member 80 from moving forward. On the other hand, the rear pin 85 is completely out of and above the second guide groove 27. At the fully closed position, the movable panel 5 is substantially flush with the roof 10.

When the movable panel 5 tilts (comes to the tilt position) from the fully closed position, the drive motor 13 moves the slider 9 forward through the push-pull cable 12. Accordingly, the engaged portion 93 of the slider 9 moves forward in the tilt region 82*d* of the cam groove 82. At this time, the tilt region 82*d* tilts downward gradually toward the front thereof, and thus, the engaged portion 93 pushes the upper wall 82*b* of the cam groove 82 forward. However, since forward movement of the support member 80 is restricted by the engagement between the front pin 84 and the first guide member 31, the support member 80 does not move forward. On the other hand, since the front pin 84 is located in the first guide groove 31*a*, and the rear pin 85 is out of and above the second guide groove 27, tilt movement of the support member 80 in the vertical direction is not restricted. Thus, the support member 80 tilts such that the rear end of the support member 80 rises with the shoe 83 serving as a fulcrum. Accordingly, the movable panel 5 also tilts such that the rear end of the movable panel 5 becomes higher than the front end (i.e., the opening 11). As shown in FIG. 9, when the engaged portion 93 reaches the front end of the tilt region 82*d*, the movable panel 5 tilts at the maximum angle. At this time, the front pin 84 is not completely out of the first guide groove 31*a* of the first guide member 31, and is still engaged with the first guide member 31.

To shift the movable panel 5 from the tilt position to the fully closed position, the drive motor 13 moves the slider 9 rearward through the push-pull cable 12. Accordingly, the engaged portion 93 of the slider 9 moves rearward in the tilt region 82*d* of the cam groove 82. At this time, since the tilt region 82*d* tilts downward gradually toward the front thereof, the engaged portion 93 pushes the lower wall 82*a* of the cam groove 82 rearward. However, since rearward movement of the support member 80 is restricted by the engagement between the front pin 84 and the first guide member 31, the support member 80 does not move rearward. On the other hand, since the front pin 84 is located in the first guide groove 31*a*, and the rear pin 85 is out of and above the second guide groove 27, tilt movement of the support member 80 in the vertical direction is not restricted. Thus, the support member 80 tilts such that the rear end of the support member 80 descends with the shoe 83 serving as a fulcrum. Accordingly, the movable panel 5 also tilts such that the rear end of the movable panel 5 becomes lower than the front end (i.e., the opening 11). When the engaged portion 93 reaches the fully closed region 82*e*, the movable panel 5 comes to the fully closed position. At this time, the front pin 84 is not completely out of the first guide groove 31*a* of the first guide member 31, and is still engaged with the first guide member 31. The rear pin 85 is still out of and above the second guide groove 27.

To shift the movable panel 5 from the fully closed position to the open position, the movable panel 5 is first shifted to the descending position, and then moved rearward.

To shift the movable panel 5 from the fully closed position to the descending position, the drive motor 13 moves the slider 9 rearward through the push-pull cable 12. Accordingly, the engaged portion 93 of the slider 9 moves rearward in the descending region 82*f* of the cam groove 82. At this time, since the descending region 82*f* tilts downward gradually toward the front thereof, the engaged portion 93 pushes the lower wall 82*a* of the cam groove 82 rearward. However, since rearward movement of the support member 80 is restricted by the engagement between the front pin 84 and the first guide member 31, the support member 80 does not move rearward. On the other hand, since the front pin 84 is located in the first guide groove 31*a*, and the rear pin 85 is out of and above the second guide groove 27, tilt movement of the support member 80 in the vertical direction is not restricted. Thus, the support member 80 tilts such that the rear end of the support member 80 descends with the shoe 83 serving as a fulcrum. Accordingly, the movable panel 5 also tilts such that the rear end of the movable panel 5 becomes lower than the front end (i.e., the opening 11). At this time, the front pin 84 comes out of the first guide groove 31*a* of the first guide member 31 downward, and enters the second guide groove 27. The rear pin 85 passes through the second guide groove 32*a* of the second guide member 32, and enters the second guide groove 27. As shown in FIG. 10, when the front and rear pins 84 and 85 come into contact with the lower wall 24*a* in the second guide groove 27, the movable panel 5 descents at the maximum angle. At the descending position, the movable panel 5 is located below the roof 10.

When the slider 9 further moves rearward from the descending position, the movable panel 5 moves rearward, and the opening 11 is gradually exposed. Specifically, at the descending position, since the descending region 82*f* tilts downward gradually toward the front thereof, the engaged portion 93 (i.e., the second sliding portion 93*b*) pushes the lower wall 82*a* of the cam groove 82 rearward. However, since the front and rear pins 84 and 85 are in contact with the lower wall 24*a* in the second guide groove 27, the support member 80 cannot further tilt downward. On the other hand, since the front and rear pins 84 and 85 are located in the second guide groove 27 and are not engaged with the first and second guide members 31 and 32, rearward movement of the support member 80 is not restricted. Thus, the support member 80 moves rearward along the second guide groove 27. Accordingly, the movable panel 5 also moves rearward. The movable panel 5, which has moved rearward, is drawn below the fixed roof 10, which is located at the rear of the movable panel 5 when at the fully closed position. At the fully open position, substantially the entire movable panel 5 is located below the roof 10. During rearward movement of the support member 80, the front and rear pins 84 and 85 are engaged with the second guide groove 27. Thus, tilt movement of the support member 80, and eventually the movable panel 5, in the vertical direction is restricted.

To shift the movable panel 5 from the fully open position to the fully closed position, the movable panel 5 is first shifted forward to the descending position, and then the movable panel 5 is obliquely moved upward. Specifically, the drive motor 13 moves the slider 9 forward through the push-pull cable 12. At the fully open position, since the descending region 82*f* tilts downward gradually toward the front thereof, and thus, the engaged portion 93 (i.e., first sliding portion 93*a*) pushes the upper wall 82*b* of the cam groove 82 forward. However, since the front and rear pins 84 and 85 are in contact with the first guide surface 27*d* in the second guide groove 27, the support member 80 cannot further tilt upward. On the other hand, since the front and rear pins 84 and 85 are located in the second guide groove 27 and are not engaged with the first and second guide members 31 and 32, forward movement of the support member 80 is not restricted. Thus, the support member 80 moves forward along the second guide groove 27. Accordingly, the movable panel 5 also moves forward.

Thereafter, the shoe 83 comes into contact with the stopper 27*f* provided in the second guide groove 27, thereby restricting forward movement of the support member 80. At this time, the front pin 84 is located below the first guide groove 31*a* of the first guide member 31, and the rear pin 85 is located below the second guide groove 32*a* of the second guide member 32. That is, upward movement of the front and rear pins 84 and 85 is not restricted by the first guide surface 27*d* of the second guide groove 27. Thus, from this point of time, the engaged portion 93 starts moving forward in the descending region 82*f*. Accordingly, the engaged portion 93 obliquely move the support member 80 such that the rear end of the support member 80 rises. At this time, the front pin 84 enters the first guide groove 31*a* of the first guide member 31, and the rear pin 85 enters the second guide groove 32*a* of the second guide member 32. Thereafter, when the engaged portion 93 reaches the fully closed region 82*e*, the movable panel 5 comes to the fully closed position. At the fully closed position, the front pin 84 is located in the first guide groove 31*a* of the first guide member 31, and the rear pin 85 is out of and above the second guide groove 32*a* of the second guide member 32.

As such, the position of the movable panel 5 is shifted by moving the support member 80 in the longitudinal direction along the passage 25 of the guide rail 24 or obliquely moving the support member 80 in the vertical direction with the shoe 83 serving as a fulcrum. At this time, the right and left shoes 83 are always engaged with the first and second guide grooves 26 and 27, whereas the front and rear pins 84 and 85 are engaged with the second guide groove 27 only when the support member 80 moves in the longitudinal direction, and comes out of the second guide groove 27 when the support member 80 is obliquely moved in the vertical direction.

As described above, in this embodiment, the engaged portion 93 is a metal plate and is integrally formed with the slider 9. Each engaged portion 93 includes the first sliding portion 93*a* having the convex curve facing upward, and sliding on the upper cam surface 82*g* of the cam groove 82. The engaged portion 93 also includes the second sliding portion 93*b* coupled to the first sliding portion 93*a* at the rear, having the convex curve facing downward, and sliding on the lower cam surface 82*h* of the cam groove 82. That is, each engaged portion 93 is not a pin but a metal plate, thereby easily forming the engaged portion 93 in the slider 9 at low costs. In addition, the support stiffness of the movable panel 5 increases. Furthermore, the engaged portion 93 supports the support member 80 along a length to some extent in the longitudinal direction, thereby increasing the support stiffness of the movable panel 5. No collar (roller) for surrounding a pin, which may be the engaged portion 93, is needed, thereby further reducing the costs.

Even if the width of the cam groove 82 (i.e., the distance between the upper cam surface 82*g* and lower cam surface 82*h*), the curvature radiuses of the first and second sliding portions 93*a* and 93*b* can be increased. Then, an excessive load is less likely to be applied between the first sliding portion 93*a* and the upper cam surface 82*g*, and between the second sliding portion 93*b* and the lower cam surface 82*h*. As a result, even if the engaged portion 93 is made of metal without a collar (roller), the engaged portion 93 (i.e., the first and second sliding portions 93*a* and 93*b*) tends to smoothly slide on the upper and lower cam surfaces 82*g* and 82*h*. In particular, the upper and lower cam surfaces 82*g* and 82*h* are part of the resin member 80b, thereby providing smoother slide. On the other hand, an excessive load is less likely to be applied between the first sliding portion 93a and the upper cam surface 82g, and between the second sliding portion 93b and the lower cam surface 82h. Thus, even if the upper and lower cam surfaces 82g and 82h are part of the resin member 80b, they are less worn away by the first and second sliding portions 93a and 93b and have excellent durability.

The present invention is not limited to the above-described embodiment. Modification can be made within the scope and spirit of the invention defined by the claims.

For example, in the above-described embodiment, the support member 80 fixed to the movable panel 5 has the cam groove 82, and the slider 9 movable along the guide rail 24 in the longitudinal direction has the engaged portion 93 engaged with the cam groove 82. Instead, the slider 9 may have the cam groove, and the support member 80 may have engaged portions engaged with the cam groove.

In the above-described embodiment, the opening/closing mechanism 8 obliquely moves the movable panel 5 relative to the opening 11 in the vertical direction such that the movable panel 5 tilts upward or downward gradually toward the rear thereof, thereby opening and closing the opening 11. In addition, the opening/closing mechanism 8 moves the movable panel 5 relative to the opening 11 in the longitudinal direction. Instead, the present invention is also applicable to an opening/closing mechanism which opens and closes the opening 11 by obliquely moving the movable panel 5 relative to the opening 11 not in the longitudinal direction but in the vertical direction only.

While in the above-described embodiment, the upper and lower cam surfaces 82g and 82h of the cam groove 82 are part of the resin member 80b, they may be part of a metal member.

In the above-described embodiment, the opening 11 of the fixed roof 10 is provided with the movable panel 5 only. In addition to the movable panel 5, the opening 11 may be provided with a fixed panel fixed to the fixed roof 10 at the rear of the movable panel 5 when at the fully closed position. In this case, the movable panel 5 corresponds to the roof panel according to the present invention, and executes similar movement to what is described above. At the fully open position, the movable panel 5 largely overlaps the fixed panel. In short, a roof panel may be included, which is provided in the opening 11, and at least obliquely moves relative to the opening 11 in the vertical direction.

The above-described embodiment is merely an example, and the scope of the present invention should not be construed as being limited to the embodiment. The scope of the present invention is defined by the claims, and includes all changes and modifications within the claims and equivalents.

INDUSTRIAL APPLICABILITY

The present invention is useful for a sunroof apparatus including a roof panel provided in an opening formed in a fixed roof of a vehicle, and an opening/closing mechanism which opens and closes the opening at least by obliquely moving the roof panel relative to the opening in the vertical direction.

What is claimed is:

1. A sunroof apparatus comprising:
a roof panel provided in an opening formed in a fixed roof of a vehicle; and
an opening/closing mechanism opening and closing the opening by at least obliquely moving the roof panel relative to the opening in an vertical direction, wherein the opening/closing mechanism includes a support member fixed to the roof panel, a guide rail fixed to the fixed roof, and extending in a longitudinal direction of the vehicle, a movable member movable along the guide rail in the longitudinal direction of the vehicle, a cam groove provided in the support member, and including an upper cam surface and a lower cam surface facing each other in the vertical direction and extending in the longitudinal direction of the vehicle, and an engaged portion provided in the movable member to project in a vehicle width direction, being engaged with the cam groove, and relatively sliding on the upper and lower cam surfaces of the cam groove by movement of the movable member,
relative slide movement of the engaged portion on the upper and lower cam surfaces of the cam groove obliquely moves the roof panel relative to the opening in the vertical direction,
the engaged portion includes a first sliding portion having a convex curve facing upward, and sliding on the upper cam surface of the cam groove, and a second sliding portion coupled to the first sliding portion, having a convex curve facing downward, and sliding on the lower cam surface of the cam groove,
wherein the engaged portion is a metal member, and bended in a substantial S shape when viewed from the vehicle width direction;
wherein the member provided with the cam groove is formed by integrally molding a resin member and a metal plate, and the upper and lower cam surfaces of the cam groove are made of the resin member;
wherein the support member is formed by insert molding of the metal plate into part of the resin member, and
wherein the support member is provided with a lower wall an upper wall located above the lower wall and extending substantially in parallel with the lower wall, and a side wall, which connects the lower wall to the upper wall, the lower wall, the upper wall and the side wall forming the cam groove.

2. The sunroof apparatus of claim 1, wherein the metal plate extends in the vertical direction in the middle of the support member and bends outward at the both upper and lower ends.

3. The sunroof apparatus of claim 1, wherein an upper portion of the lower wall, an outer portions of the upper wall and the side wall are part of the resin member.

4. The sunroof apparatus of claim 1, wherein the engaged portion is a metal plate.

5. The sunroof apparatus of claim 4, wherein the engaged portion is integrally formed with a slider.

* * * * *